United States Patent [19]

Howe, Jr.

[11] 3,709,575
[45] Jan. 9, 1973

[54] SHAFT LOCKING DEVICE
[75] Inventor: Ralph S. Howe, Jr., New Britain, Colo.
[73] Assignee: Textron Inc., Providence, R.I.
[22] Filed: April 19, 1971
[21] Appl. No.: 135,314

[52] U.S. Cl. ................................................308/236
[51] Int. Cl. ...........................................F16c 35/06
[58] Field of Search......................................308/236

[56]       References Cited

UNITED STATES PATENTS 2,228,282   1/1941   Miller..................................308/236

Primary Examiner—Milton Kaufman
Assistant Examiner—Frank Susko
Attorney—Sandoe, Hopgood & Calimafde

[57]  ABSTRACT

The invention provides means for concentrically mounting a ring on a shaft and for automatically locking the same. Only one sleeve part is required, in addition to the ring. Reliance is placed on first coacting mated tapering surfaces on the sleeve and ring bore, to establish the concentric relation, and upon second coacting cam formations integral with the sleeve and ring, to establish axially cammed displacement of the ring and sleeve into locked concentric relation. In the forms disclosed, the sleeve is split and may have frictional interference with the mounting-shaft size, and the sleeve is held captive, in unit-handling assembled relation within the ring bore. Also, in the forms disclosed, the ring is the inner race ring of an antifriction bearing, and the concentric tapering surfaces are positioned to directly radially and concentrically support the raceway region.

19 Claims, 4 Drawing Figures

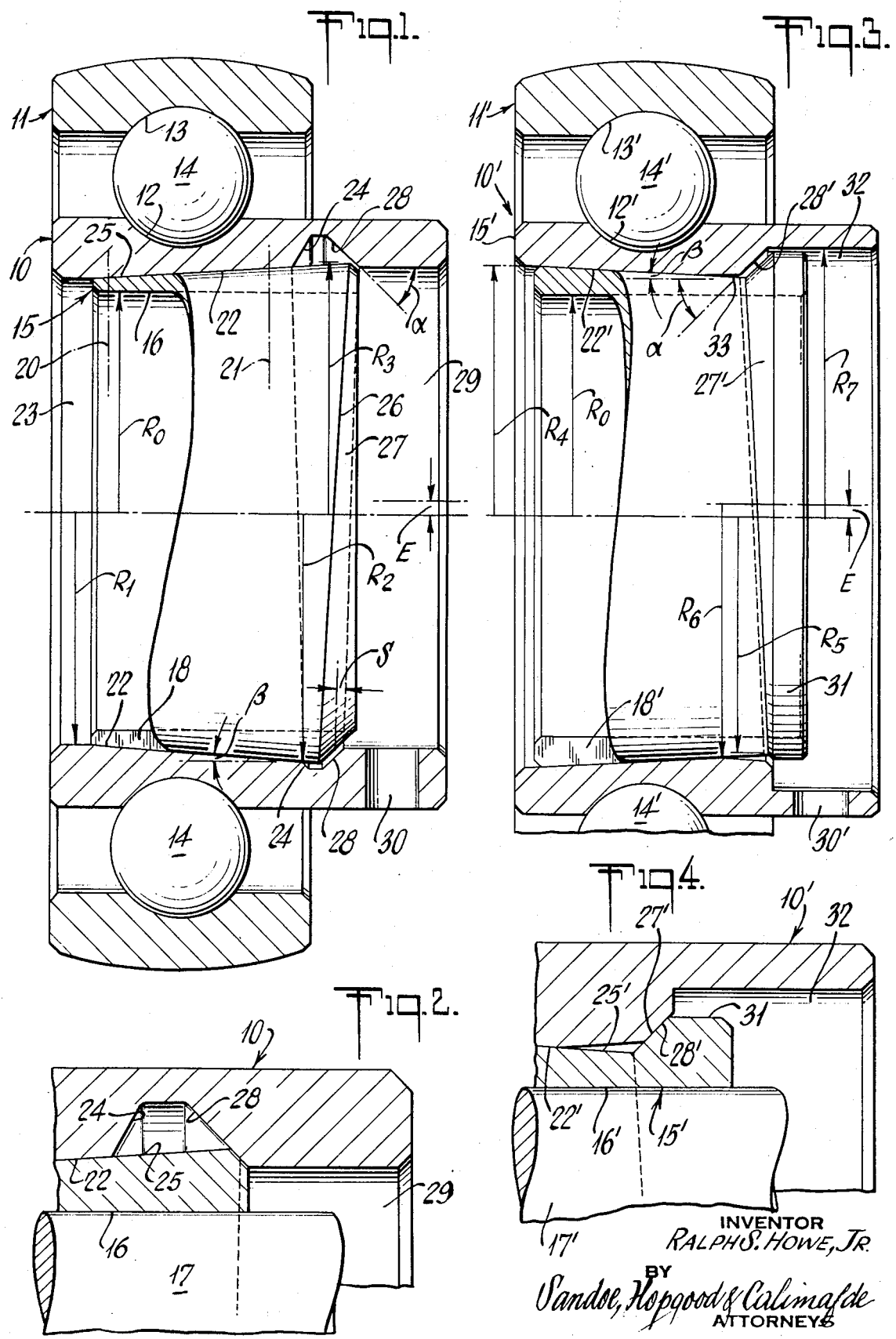

SHAFT LOCKING DEVICE

This invention relates to shaft-locking mechanism for locked mounting of an article, such as an anti-friction bearing, on a shaft.

Aside from the age-old techniques employing one or more set-screws to anchor a hub or ring to a shaft, there have been various techniques employing a locking collar, with lock reaction between mating eccentric surfaces on axially overlapped regions of the collar and hub or ring. Insofar as I am aware, all such techniques produce angularly local stress concentration, resulting not only in local ring deformation and displacement, but also in a degree of misalignment of the ring axis with respect to the shaft axis. If the ring is part of an antifriction bearing, these conditions spoil the truly concentric orientation of the race, to an extent which becomes intolerable for many applications. The problem of concentric mounting has been the subject of various measures, all of which are unduly complex, expensive or are otherwise inadequate, insofar as I am aware.

It is, accordingly, an object of the invention to provide an improved shaft-locking structure, avoiding deficiencies of past structures.

Another object is to provide shaft-locking structure which is also inherently concentric in its action, supporting a hub, ring on the like on a shaft.

A further object is to meet the above objects with mechanism which may be pre-assembled with the hub or ring, and which is thus a self-retaining unit-handling shaft-lockable subassembly.

It is a specific object to achieve the foregoing objects with structure requiring no more than one part, in addition to the hub or ring.

Another specific object is to provide structure of the character indicated whereby a given inner bearing ring or the like may be effectively locked to a selected one of a variety of shaft sizes.

It is a general object to provide locking mechanism of the character indicated which is relatively simple and inexpensive, which may be substantially "blind" in installed position, presenting no snagging projections or edges, and which may be inherently axially compact.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is a vertical sectional view of an anti-friction bearing assembled in unit-handling relation with locking means of the invention;

FIG. 2 is an enlarged fragmentary sectional view of the parts in locked relation to a shaft, the section being taken for the condition of relative rotation of inner parts, away from the relation depicted in FIG. 1;

FIGS. 3 and 4 are views corresponding to FIGS. 1 and 2, respectively, to show a modification.

Briefly stated, the invention provides means for concentrically mounting a ring on a shaft and for automatically locking the same. Only one sleeve part is required, in addition to the ring. Reliance is placed on first coacting mated tapering surfaces on the sleeve and ring bore, to establish the concentric relation, and upon second coacting cam formations integral with the sleeve and ring, to establish axially cammed displacement of the ring and sleeve into the concentric relation. In the forms disclosed, the sleeve is split and preferably has frictional interference with the mounting-shaft size, and the sleeve is held captive, in unit-handling assembled relation within the ring bore.

In FIGS. 1 and 2, the invention is shown in application to an antifriction bearing comprising inner and outer rings 10–11, with opposed circumferentially continuous raceways, 12–13, and with a set of antifriction elements 14 riding both raceways and supporting the rings 10–11 in spaced relation. A sleeve 15 is positioned in the bore of the inner ring 10. Sleeve 15 has an axially elongate cylindrical bore 16 for locked mounting to a shaft 17, and it is the formation of sleeve 15 and its fit to and coaction with the bore of ring 10 which establish the locked mounting of the invention.

The sleeve 15 possesses a degree of radially compliant action because it is preferred that its bore shall have resiliently loaded interference-fit engagement with the shaft 17. Thus, sleeve 15 may be of molded plastic and circumferentially continuous, to serve certain load ranges. On the other hand, I indicate my present preference that sleeve 15 be split, as at the angular locality indicated at 18; such a sleeve may be of relatively hard and incompressible material such as steel, powdered metal, or molded plastic (e.g., a relatively dense urethane), the desired compliant action being provided radially (i.e., radial expansion or contraction of sleeve 15, with respect to its unstressed radial extent $R_o$), in view of the split at 18.

For concentric support of the ring 10 and its raceway 12, elongated gently tapered conical surfaces determine the fit, preferably over an axially extensive region which conservatively spans the entire race-supporting volume of ring 10, as at least between gage points 20–21. As shown, the concave one of these tapers is identified 22, being formed in a first axial region beneath raceway 12, and extending coaxially with the raceway 12, from an inlet cylindrical bore 23 of nominal reduced radius $R_1$, to a large end of radius $R_2$, shown at intersection with an eccentric counterbore 24 in ring 10. The convex one of these tapers is identified 25 and characterizes the substantial axial length of sleeve 15, extending from a reduced end of radius substantially $R_1$, to a large end of radius $R_3$ which is preferably slightly greater than $R_2$, so that the end of sleeve 15 substantially overhangs and spans the counterbore 24. As shown, the large end of sleeve surface 25 terminates at a slightly inclined truncating edge 26, defined by intersection with an eccentric conical surface 27, which characterizes the remaining exterior contour of sleeve 15.

In accordance with the invention, integral axially camming formations, reacting between sleeve 15 and ring 10 upon their relative rotation, are relied upon to axially displace sleeve 15 and ring 10 to the point of firmly locked and coaxial reference of raceway 12 with respect to shaft 17; in this situation, sleeve 15 is an annular wedge having large and substantially uniformly distributed axial and circumferential footing on shaft 17, and providing essentially the same kind of well-distributed support for ring 10, in the raceway body region 20–21. As shown, axial-camming action derives from reaction between the eccentric conical surface 27 and a similar but concave conical surface 28 in the counter bore 24. The surfaces 27–28 are relatively steeply tapered at an angle $\alpha$, which is preferably substantially 45°, or at least no less than substantially 40°, so that a substantial axially reacting force component develops from eccentric-surface engagement, as the sleeve 15 and ring 10 are subjected to relative rotation. In FIG. 1, the legend E identifies the eccentric offset of both camming conical surfaces, with respect to the sleeve axis common to surfaces 16–25 (in the case of surface 27), and with respect to the axis common to surfaces 12-22 (in the case of surface 28).

The remaining bore contour of ring 10 may be cylindrical at the adjacent end 29, and of the same nominal radius $R_1$ as that shown for the opposite end 23. The end 29 may be of sufficient axial extent to permit formation of a drift-pin hole 30 or other local tool-engageable discontinuity therein, for use in setting or releasing a locked condition. When preassembled, as shown in FIG. 1, i.e., with sleeve 15 in substantially its unstressed condition, the range of overlap and sizing of conical surfaces 22–25 and 27–28 is preferably such that a small axial clearance S exists, to allow an axial displacement S of sleeve 15 to the right (in the sense of FIG. 1), thereby providing a degree of radial clearance for expansion of sleeve 15 when pressed into slight interference-fit relation with shaft 17.

It will be noted that in the FIG. 1 situation, wherein the noted eccentric axes are in or substantially in register, a measure of radial overlap exists between sleeve 15 and the axially entrapping (and, therefore, retaining) reduced ends 23–29 of the bore of ring 10. It will be understood that the radially compliant compressibility of sleeve 15 should be such as to permit axial endwise inserting assembly of sleeve 15 to the ring bore, i.e., past the region of transiently compressed yielding interference with one of the reduced ends 23–29 of the bore. Once past this constriction, sleeve 15 resiliently restores itself to the size and positioning illustrated by FIG. 1. In the case of a split sleeve 15, as shown, the effective angular extent of the split must be sized to accommodate the temporary compliant constriction involved in the pre-assembly step.

In practice, the pre-assembly of sleeve 15 to ring 10 may be a manufacturing step, in which case the complete antifriction bearing carries and retains its own locking and mounting means, all packaged as a unit-handling article. Alternatively, the fully assembled bearing (10-11-14) may be packaged with one or more unassembled sleeves 15, all having the same, described external contour 25–27, but each having a different cylindrical bore radius $R_o$, to provide selective applicability to a range of different shaft diameters. In every case, however, the sleeve 15, with bore radius $R_o$ selected for frictional interference-fit to the desired diameter of shaft 17, is pre-assembled to the bearing ring 10 prior to assembly to the shaft. Generally, it is desired that shaft assembly proceed with shaft entry at the end 23, to assure maximum freedom for sleeve expansion (after closing the clearance S); this is a simple manual operation, and the bearing is then displaced along the shaft to its desired mounting location. The frictional grip of sleeve 15 on shaft 17 is sufficient to temporarily hold a selected position, should it be necessary to position other elements before locking the position of bearing ring 10. All that is needed for locking is to rotate ring 10 until jammed, with or without use of a tool at 30. Jamming results from axial-camming of the sleeve wedge 15 between shaft 17 and bore portion 22, through the engagement of interfering rises of the eccentric surfaces 27–28 (see FIG. 2). In general, it is preferred that dimensions and proportions be selected to achieve the jammed (locked) condition for a partial relative rotation of ring 10 and sleeve 15 to the extent of 30° to 150°, from the condition depicted in FIG. 1.

It should be noted that for a unidirectionally rotated shaft 17 or bearing outer ring 11, there is a given correct direction of rotation in order to establish a permanent locked condition of sleeve 15 to the shaft 17 and ring 10. Continued loaded rotation in the same direction improves the locked condition, as long as there is a sufficient remnant local radial deformability of the sleeve 15 in its engagement to the shaft 17 or in its engagement to the bore portion 22, the action being a planetary creep between two adjacent loaded surfaces of slightly different radius. Eventually, however, all engaged coaxial surfaces will have merged on coincident radii of local contact, the lock being tightly and concentrically set when creep action ends. Should the working rotation be in the opposite direction, in the presence of sufficient radial load, the initial setting of the lock will be released, momentarily, and then lock action will re-establish itself for the oppositely rotated direction of ring 10 with respect to sleeve 15, resulting in just as secure and just as concentric a support for the raceway 12. During the momentary release, the axial positioning of ring 10 on shaft 17 is not lost, because of the inherent preloaded frictional grip which resulted from initial interference-fit assembly of sleeve 15 to shaft 17.

FIGS. 3 and 4 illustrate a modification, wherein corresponding bearing and sleeve parts and the shaft are given the same reference numbers, but with primed notation. The primary difference between the embodiments of FIGS. 1 and 3 is that in FIG. 1, the gently tapered surfaces (22–25) and steeply tapered surfaces (27–28) are converging in directions away from a radial plane between them, whereas in FIG. 3 the corresponding gently tapered surfaces (22'–25') and steeply tapered surfaces (27'–28') are divergent in directions away from a radial plane between them. Thus, the sleeve 15' of FIGS. 3 and 4 has a cylindrical bore 16' of nominal radius $R_o$ and a gently tapered concentric outer conical surface 25' which extends from a large outer end (of radius $R_4$), to a reduced or smaller end (of minimum radius $R_5$) at juncture with the steeply inclined eccentric conical camming surface 27'. Surface 27' is one face of an enlarged and otherwise cylindrical end 31 of sleeve 15'; the cylindrical surface 31 is eccentric about the same axis as is conical surface 27'. In similar fashion, the gently tapering elongated concave surface or bore portion 22' (concentric with raceway 12') extends from a large end (of at least the radius $R_4$), to a reduced end (of radius $R_6$, greater than $R_5$) at or near juncture with the steeply inclined eccentric conical surface 28'. Surface 28' flares outwardly to juncture with a cylindrical counterbore 32, having a radius $R_7$ which clears the maximum eccentric extent of the sleeve end 31. To complete the profile shown, a short relieving conical fillet 33 connects the primary conical surfaces 22'–28', fillet 33 being concentric with the bearing axis and serving to avoid stress concentration along intersection of adjacent tapering surfaces.

As with FIG. 1, the sleeve 15' and inner ring 10' have regions of radial overlap serving to entrap or axially retain sleeve 15' in pre-assembled relation with ring 10'. And all axial end corners are preferably chamfered, as shown, The gap 18' at the split of sleeve 15' is of angular extent to permit transient radial compression of the lesser end dimension (compressed from the unstressed radius $R_4$ to the lesser or throat radius $R_6$, for right-to-left end-wise pre-assembling insertion of sleeve 15' in the bore of ring 10'. Once pre-assembled, the resilient nature of sleeve 15' returns the same to its unstressed condition, shown in FIG. 3. Assembly to the shaft 17' is as described for FIGS. 1 and 2, the direction of shaft insertion in sleeve 15' being preferably right-to-left, in the sense of the drawings. Once in desired location, sleeve 15' has preloaded resilient grip to shaft 17', to hold the axial location, and the lock is set by rotation of ring 10' until jammed, by tool action at 30' if desired. Axially directed cam action between surfaces 27'-28' draws the annular wedge of sleeve 15' into circumferentially and axially extensive intimate concentric engagement with shaft 17' and with the bore portion 22', as shown in FIG. 4.

It will be seen that I have described improved and highly effective locking and mounting means meeting all stated objects. The action is axially and circumferentially extensive, assuring concentric and directly radial support of the raceway 12 (12'), without danger of the angular misalignment or shaft-scoring, which characterize mounting with known locking-collar devices. No set screws or threads are required, thus providing important economies. Further economies are realized by reason of the inherently simple machining operations which may be used to generate all surfaces, and by adaptability to molding techniques as may best accommodate the particular selected materials; for example, all machined surfaces, including the eccentric surfaces, may be cut on a standard automatic multiple-spindle screw machine.

It will be understood that cam angles, eccentricities, and concentric-taper angles for frictional and other properties, may vary as dictated by particular requirements; generally speaking, the gently tapered concentric conical angle $\beta$ is at least no greater than substantially 10°, being preferably of 2° to 5° slope with respect to the bearing axis. A given bearing can be accurately mounted upon and locked to a relatively wide range of shaft diameters, through proper choice of bore size for sleeve 15 (15'). The assembly is inherently compact as to axial-width requirements, lending itself to "blind" assembly of the sleeve, and with no snagging projections. Also, for the conventional application in which the outer bearing ring 11 is first mounted in frame or housing structure (not shown), the preassembled nature of the bearing assures that inner ring 10 (which must be partially rotated to achieve mounted and locked relation to the shaft) will always be concentrically positioned and rotated, throughout the mounting and locking procedure.

What is claimed is:

1. In combination, a bearing or the like ring having a bore and a locking element carried within the bore for locking said ring to a shaft; said ring having a first relatively gently tapered elongated conical bore portion concentric with the ring axis and a relatively steeply tapered conical counterbore at one end of said bore portion, said counterbore being eccentric to the ring axis, and said tapers being inclined in opposite directions with respect to a radial plane between said surfaces; said locking element comprising a split sleeve having a cylindrical bore sized for fit with an intended mounting-shaft size, said sleeve having an outer contour characterized by a first gently tapered elongated conical surface portion concentric with the sleeve bore and in substantial coaxial registry with said first bore portion, said outer contour being further characterized by a second and relatively steeply tapered surface portion in substantial registry with and facing said counterbore.

2. The combination of claim 1, in which the inclination of said tapers is such as to converge both tapers in directions away from said radial plane.

3. The combination of claim 1, in which the inclination of said tapers is such as to expand both tapers in directions away from said radial plane.

4. The combination of claim 1, in which said relatively gentle tapers are substantially the same and are at least no greater than substantially 10°.

5. The combination of claim 4, in which said relatively gentle tapers are in the range of 2° to 5°.

6. The combination of claim 1, in which said relatively steep tapers are substantially the same and are at least no less than substantially 40°.

7. The combination of claim 6, in which said relatively steep tapers are substantially 45°.

8. In combination, a bearing inner ring comprising having an outwardly facing circumferentially continuous antifriction-element raceway in a first axial region, said ring having a bore characterized by a relatively gently tapered elongated conical bore portion coaxial with said raceway and in substantial overlap with said first axial region, a sleeve having a cylindrical bore sized for fit with an intended mounting-shaft size, said sleeve having an outer conical surface concentric with said cylindrical bore and of substantially the same taper as said gently tapered bore portion, said bore portion and outer conical surface having circumferential and axially extensive interference when overlapped in said first axial region, and axially-operative cam means including coacting eccentric similarly tapered portions of said ring and sleeve in a second axial region of their overlap, said cam means being operative upon relative rotation of said ring and sleeve to axially cam said ring and sleeve in the direction to engage said gently tapered bore portion with said conical surface.

9. The combination of claim 8, in which said first axial region is of greater axial extent than said raceway and fully overlaps the same, whereby antifriction element support is directly and uniformly radial with respect to the ring axis.

10. The combination of claim 8, in which said second axial region is axially offset from said first axial region, where any asymmetry of axial camming force development is substantially local to a region removed from that of antifriction-element support.

11. The combination of claim 8, in which said sleeve is characterized by a degree of radially compliant expandable action.

12. The combination of claim 11, in which said sleeve is of metal.

13. The combination of claim 11, in which said sleeve is of plastic material.

14. In combination, a bearing inner ring comprising having an outwardly facing circumferentially continuous antifriction-element raceway in a first axial region, said ring having a bore characterized by a relatively gently tapered elongated conical bore portion coaxial with said raceway and in substantial overlap with said first axial region, a sleeve having a cylindrical bore sized for fit with an intended mounting-shaft size, said sleeve having an outer conical surface concentric with said cylindrical bore and of substantially the same taper as said gently tapered bore portion, said bore portion and outer conical surface having circumferential and axially extensive interference when overlapped in said first axial region, and axially-operative cam means including coacting portions of said ring and sleeve in a second axial region of their overlap, said cam means comprising relatively steeply inclined eccentric tapered surfaces on said ring and sleeve and being operative upon relative rotation of said ring and sleeve to axially cam said ring and sleeve in the direction to engage said gently tapered bore portion with said conical surface.

15. The combination of claim 14, in which said sleeve is split.

16. The combination of claim 14, in which the tapering directions of said relatively gentle taper and of said relative steep taper are axially opposed, both tapers of said ring having a region of radial overlap with both tapers of said sleeve, whereby axial retention of an assembled ring and sleeve is inherent, said sleeve being split and stiffly compliantly deformable, the angular extent of the split being such in relation to the extent of said region of radial overlap for at least one axial direction of inserted assembly of said sleeve into said ring that said sleeve may be transiently radially compressed to permit such assembly.

17. The combination of claim 16, in which said ring includes an externally accessible tool-engaging discontinuity for torque application to said ring; whereby to install said combination on a shaft of said size, the assembly is first axially applied to desired position on the shaft, with interference-fit frictional engagement of said sleeve to the shaft, and then the ring is rotated to establish eccentrically cammed locking of the raceway in concentric relation to the shaft, with optional provision for tool-applied torque to set the lock.

18. In combination, a bearing inner ring comprising having an outwardly facing circumferentially continuous antifriction-element raceway in a first axial region, said ring having a bore characterized by a relatively gently tapered elongated conical bore portion coaxial with said raceway and in substantial overlap with said first axial region, a sleeve having a cylindrical bore sized for fit with an intended mounting-shaft size, said sleeve having an outer conical surface concentric with said cylindrical bore and of substantially the same taper as said gently tapered bore portion, said bore portion and outer conical surface having circumferential and axially extensive interference when overlapped in said first axial region, and axially-operative cam means including coacting portions of said ring and sleeve in a second axial region of their overlap, said cam means being operative upon relative rotation of said ring and sleeve to axially cam said ring and sleeve in the direction to engage said gently tapered bore portion with said conical surface, said sleeve and ring having integral circumferentially extending and radially overlapping portions which axially retain assembly of said sleeve and ring, in readiness for shaft mounting.

19. The combination of claim 8, wherein said similarly tapered eccentric portions are sufficiently steep to develop both a substantial axial-displacement force reaction and a substantial radially-compressive clamping action in axially offset elation to said first axial region.

* * * * *